United States Patent [19]

Ritzerfeld

[11] 4,009,954
[45] Mar. 1, 1977

[54] ELECTROSTATIC COPIER

[76] Inventor: Gerhard Ritzerfeld, Schorlemer Allee 14, 1000 Berlin 33, Germany

[22] Filed: Sept. 11, 1975

[21] Appl. No.: 618,685

[30] Foreign Application Priority Data

Sept. 17, 1974 Germany .......................... 2444941
Nov. 1, 1974 Germany .......................... 2452429

[52] U.S. Cl. .................................. 355/7; 355/13; 355/40; 355/75
[51] Int. Cl.² ........................................ G03G 15/00
[58] Field of Search ........ 355/7, 11, 13, 39, 40–43, 355/75, 79; 354/109, 292; 352/52, 97

[56] References Cited

UNITED STATES PATENTS

| | | | |
|---|---|---|---|
| 2,744,443 | 5/1956 | Higonnet et al. | 355/45 X |
| 2,813,457 | 11/1957 | Fitz Gerald | 355/79 X |
| 3,544,212 | 12/1970 | Umahashi et al. | 355/42 |
| 3,642,370 | 2/1972 | Meredith et al. | 355/75 |
| 3,880,521 | 4/1975 | Eppe et al. | 355/40 |
| 3,913,118 | 10/1975 | Abrams | 354/292 |

*Primary Examiner*—L. T. Hix
*Assistant Examiner*—Kenneth C. Hutchison
*Attorney, Agent, or Firm*—Michael J. Striker

[57] ABSTRACT

A transparent support member of an electrostatic copier has a support surface and an opposite surface. Light sources direct light against the opposite surface and first pattern sheets are held on the support surface and define between themselves an elongated gap. A second pattern sheet overlies the first pattern sheets and is provided with lines of indicia extending parallel to the gap. A transporting arrangement transports the second pattern sheet stepwise relative to the first pattern sheets in a direction normal to the gap so as to expose succeeding ones of the lines in the gap. A transparent web provided with masking portions is located between the light sources and the opposite surface, or between the opposite surface and the first pattern sheets, and can be moved relative to the gap so that different ones of the masking portions can be placed into predetermined positions relative to the pattern sheets.

24 Claims, 8 Drawing Figures

ELECTROSTATIC COPIER

BACKGROUND OF THE INVENTION

The present invention relates generally to a copier, and in particular to an electrostatic copier.

The term "electrostatic copier" as used herein is intended to include a xerographic copier. In such electrostatic copiers it is known to place the pattern sheets which are to be copied or produced face down onto a transparent supporting plate or the like, and light is directed against the underside of the transparent plate and a system of mirrors and lens arrangements is used to form a reproduction of the indicia on a copy sheet, either directly or mediately by means of a copy drum.

It is often desirable to be able to copy only portions of a pattern sheet, for example to copy certain lines of indicia on a pattern sheet which should be placed in a desired relationship relative to parts of a form, for example relative to boxes or the like provided as part of a form. It has been proposed in the prior art to provide an arrangement wherein a first set composed of two or more pattern sheets is used having information that is always required on the copy to be made, for example various boxes of a form. The pattern sheets of this first set are stationary and a pattern sheet of a second set is movable relative to the pattern sheet of the first set so that different lines of indicia are provided on the pattern sheet of the second set become exposed in the gap, to be reproduced on a copy sheet together with the information on the pattern sheets of the first set. For example, it is often desirable to provide a work preparation plan which is produced to begin with in its entirety, and of which different portions are to be copied for subsequent use, each portion to contain only parts of the total plan. Thus, parts of the total plan may be used for salary calculating purposes, for material-allocating purposes, for time-allocating purposes, and the like. For these purposes, only those portions of the overall plan which are relevant to the particular copy, need be reproduced. To make copies of this type, copy sheets can be provided on which the necessary basic information is already preprinted, so that only those portions of the overall plan need be copied onto the copy sheets which are relevant to the particular requirement. However, this means that an adequate quantity of preprinted copy sheets be kept available at all times, which is often disadvantageous because the supply may run out just when these preprinted copy sheets are needed most urgently. Also, preprinting of the copy sheets involves additional work and expenses, and if the type of copy to be made changes frequently it requires additional work to replace a supply of one type of preprinted copy sheet with a supply of a different type of preprinted copy sheets.

SUMMARY OF THE INVENTION

Accordingly, it is a general object of the present invention to avoid the disadvantages of the prior art.

More particularly, it is an object of the present invention to provide an improved electrostatic copier which permits the reproduction of varying portions of indicia or text in conjunction with indicia or text which do not vary, or only vary at infrequent intervals, such as boxes of a preprinted form, preprinted headings of a form, or the like, but without requiring preprinted copy sheets.

The re-setting of the apparatus for operating with different types of copy sheets is to be possible with a minimum of work and with a maximum of security against human error.

Moreover, it is to be possible not only to select individual lines or groups of lines of indicia or text for reproduction, but also to exclude portions within these groups from reproduction.

In keeping with these objects, and with others which will become apparent hereafter, one feature of the invention resides, in an electrostatic copier, in a combination which comprises a transparent support member having a support surface and an opposite surface, light source means for directing light against the opposite surface, and pattern-sheet holding means for holding on the support surface first pattern sheet means which defines an elongated gap and for also holding second pattern sheet means overlying the first pattern sheet means and provided with lines of indicia parallel to the gap.

Transporting means is provided for transporting the second pattern sheet means stepwise relative to the first pattern sheet means in direction normal to the gap so as to expose succeeding ones of the lines in the gap. Masking means is intermediate the first pattern sheet means and the light source means and provided with masking portions. The masking means includes moving means for moving different ones of the masking portions into predetermined positions relative to the pattern sheet means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
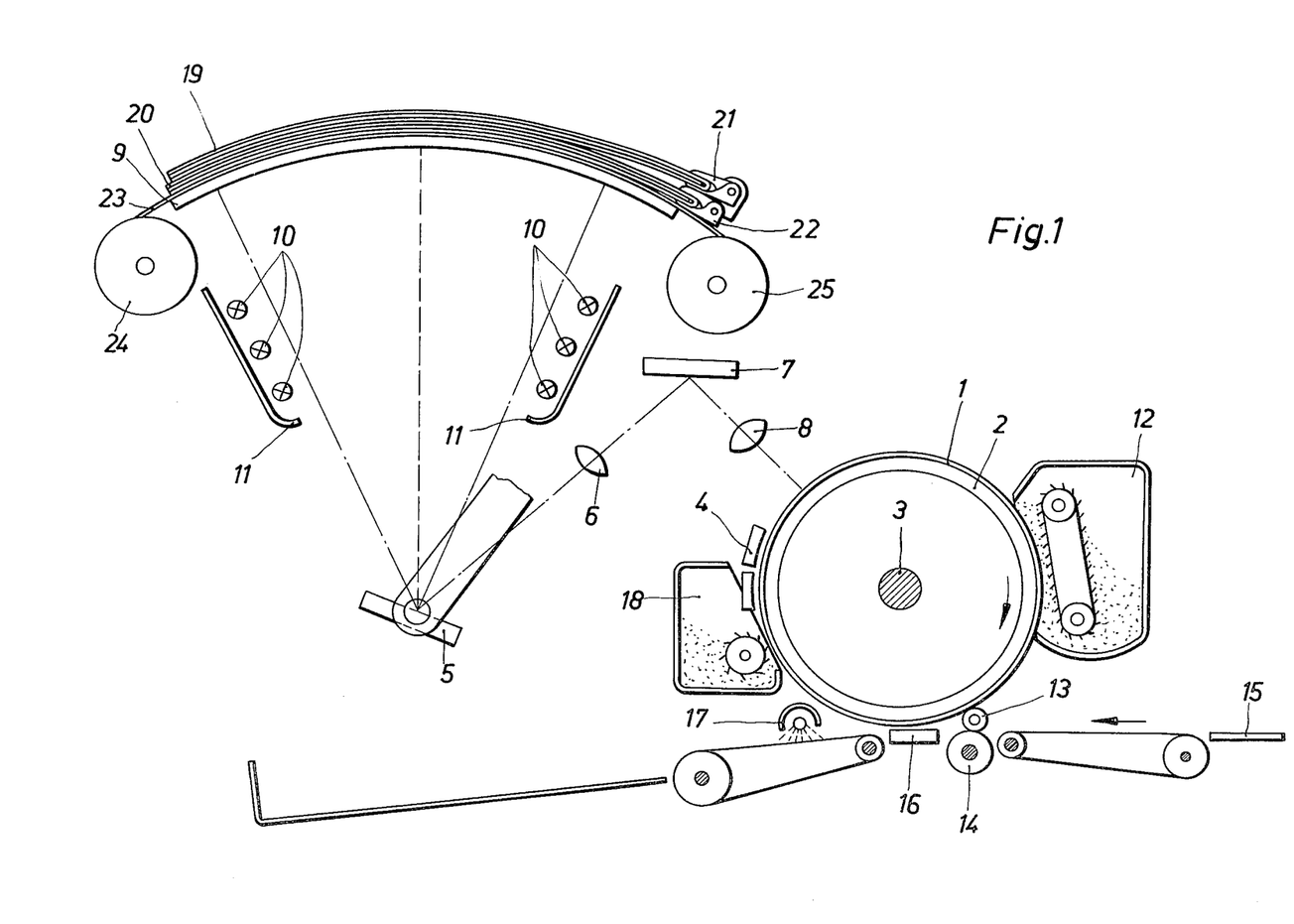
FIG. 1 is a diagrammatic side view of those portions of a xerographic copier which are necessary for an understanding of one embodiment of the invention.
Figure 2:
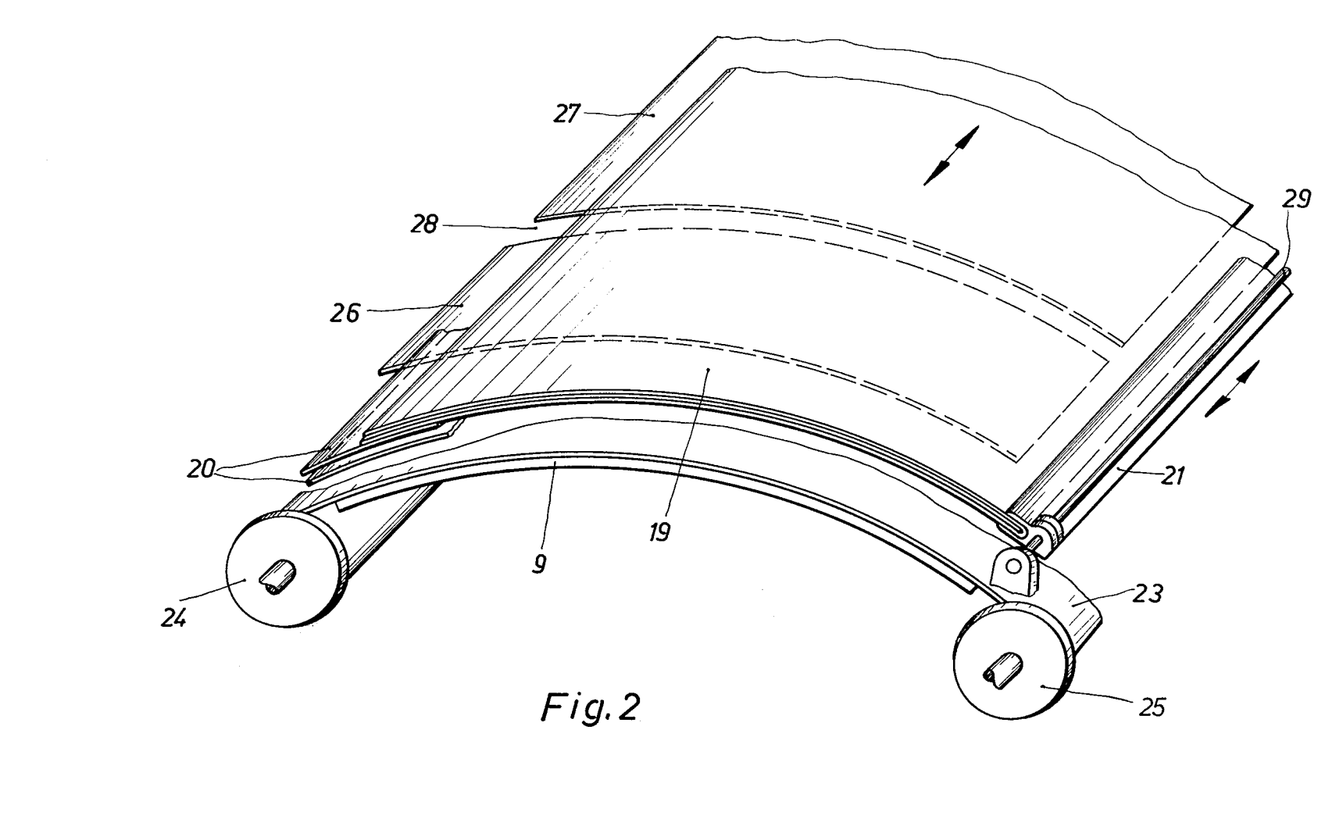
FIG. 2 is a fragmentary top-perspective view illustrating a detail of the embodiment in FIG. 1.
Figure 3:
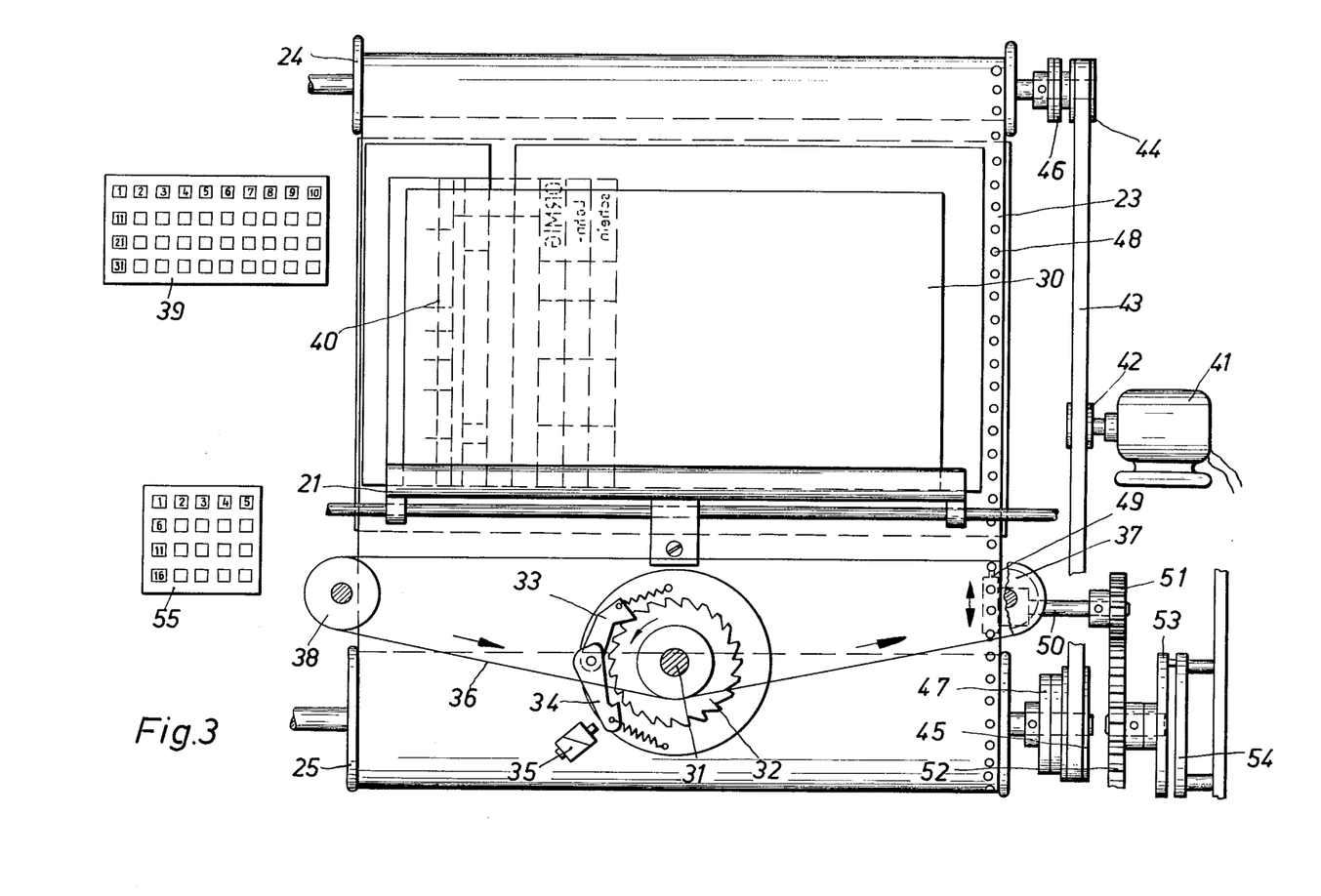
FIG. 3 is a somewhat diagrammatic view, illustrating transporting means of the embodiment in FIG. 1.

FIGS. 1–3 illustrate a first embodiment of the invention. FIG. 1 shows a xerographic or electrostatic copying apparatus having a copying drum 2 provided with a coating in form of a layer 1 of light-sensitive material. The drum 2 can be rotated about an axis defined by a shaft 3 by a not illustrated drive. An electrostatic charging device 4 is provided, surrounding a portion of the periphery of the drum 2 over the entire axial length of the latter; sequential portions of the circumference of the layer 1 which pass the device 4 are electrostatically charged. A tiltable mirror 5, a lens system 6, a fixed mirror 7 and a further lens system 8 are used to project onto the surface of the layer 1 a mirror image of the pattern sheet or original located on a transparent support 9, for example a glass plate or the like. Lamps 10 and reflectors 11 are provided to direct light against the support 9 in order to illuminate the original (hereafter called pattern sheet or sheets for convenience) located thereon to be reproduced.

The mirror 5 is tilted in synchronism with the rotation of the drum 2 and thus reflects and reproduces onto the layer 1 those portions of the pattern sheet or sheets located on the support 9, which are not blocked out by being covered. The electrostatic charges which have been produced in the layer 1 by means of the device 4 are negated in those areas of the layer 1 which have been exposed to light, so that only the remaining portions of the layer 1 continue to carry electrostatic charges.

During the further rotation of the drum 2 the thus remaining charged portions of the layer 1 move past a powder supply device 12 which contacts these charged portions with a powder that adheres to them. The copy sheet 15, i.e. a sheet onto which a copy is to be made, is advanced by the illustrated advancing device (see the arrow) to the rollers 13, 14 which grip the sheet 15 and advance it past the drum 2. During the time during which the sheet 15 advances past the drum 2, a charge-transfer device 16 serves to transfer the negative which is formed on the layer 1 as a powder-replica (but mirror-reversed) of the original, onto the sheet 15. Subsequently, the sheet 15 on which the transfer powder now forms a correct (versus a mirror-reverse) replica of the original, passes a fixing station in which an infrared radiator 17 is used to bond the powder to the sheet 15. Each sequential portion of the layer 1 subsequently passes a cleaning station 18 at which any residual powder particles are removed from the layer 1 before the latter is recharged again by the device 4.

The pattern sheets or originals to be copied, of which the lower pattern sheets 26 and 27 are shown in FIG. 2, may be arranged in transparent plastic envelopes 19 and 20 which overlie the support 9, with the indicia-carrying surfaces of the pattern sheets facing the support 9. The envelopes 19 and 20 are connected to clamping devices 21 and 22 extending along an edge portion of the support 9 over the entire length of this edge portion. However, it should be understood that the pattern sheets could themselves be directly engaged by the clamping devices 21 and 22, instead of being accommodated in the transparent envelopes 19 and 20.

The construction thus far described is known from the prior art, both as to its structure and its operation.

According to the present invention there is further provided a masking means, here in form of a transparent web 23 of, e.g. synthetic plastic material, which extends in the illustrated embodiment between the support 9 and the envelope 20, but which could also extend between the support 9 and the lamps 10, i.e. at the other surface of the support 9 from the one where it is shown to be located in FIG. 1. The web 23 is convoluted about rollers 24 and 25 and can be advanced by rotating the rollers 24, 25, so that it travels in a direction normal to the elongation of the clamping devices 21 and 22. The web 23 is provided with a plurality of indicia which are imprinted, produced photographically or otherwise formed on the web 23 and which are spaced from one another in direction lengthwise of the web 23. The different indicia are different in accordance with the different requirements, for example they may be in form of text required for a purchase order form, text required for a repair order form, text required for a salary payment form, and the like. In addition, the web 23 may be provided with opaque regions by means of which certain portions of lines selected for copying can be blocked out to be eliminated from copying. Any lines or blocks of indicia provided on the web 23 extend over the entire width of the pattern sheets, i.e. over the entire dimension of the pattern sheets in direction normal to the plane of FIG. 1. Thus, any exposed portions of the pattern sheets are reproduced on the light-sensitive layer 1 together with those portions (and the corresponding indicia or other matter) of the web 23 which have been moved into copying relation relative to the support 9 and the pattern sheets by turning the rollers 24, 25. A drive for the rollers is not separately illustrated, but it will be understood that any conventional drive can be used for this purpose. It is advantageous if each of the rollers 24, 25 can be driven, so that the web can be wound off the roller 24 onto the roller 25, and subsequently be rewound onto the roller 24.

FIG. 2 shows the arrangement of the lower pattern sheets 26 and 27 relative to the support 9. The lower clamping device 22 and the pattern sheet which is located in the upper transparent envelope 19 have not been illustrated to facilitate the showing of the other features. It will be seen that the lower pattern sheets 26 and 27 define between themselves a gap 28 of desired width in which a portion of the upper pattern sheet (not shown, but located in the upper envelope 19) can be exposed, so that any line or lines of indicia of this portion will be visible through the gap 28. The clamping device 21 is shiftable lengthwise of a shaft 29, so that in dependence upon the position of the clamping device 21 different portions of the pattern sheet in the upper transparent envelope 19 become visible in the gap 28 and can thus be reproduced on the layer 1.

If, for example, different forms are required, each having a non-varying printed portion, for example a certain heading or the like, and a variable portion which relates to a particular job to be carried out, then the pattern sheet 26 may be provided with the indicia of the head portion, i.e. for example name and address of a customer or the like. The pattern sheet in the upper transparent envelope 19 may contain a plurality of different items of information, only some of which are to be reproduced in conjunction with the subject matter appearing on the pattern sheet 26, and the items to be so reproduced are then placed so as to be visible in the gap 28. The pattern sheet 27 may simply serve to block portions of the pattern sheet in envelope 19 which are not to be copied, and it should be understood that despite the fact that it is called a "pattern" sheet the sheet 27 may be blank. Of course, it may also be provided with indicia which are to be copied, if this is desired in a particular application. The web 23, on the other hand, carries information for the individual forms, for example lines marking different boxes and subdivisions of a form, and that part of the web 23 which carries a particular form is then placed in a position beneath the pattern sheets 26 and 27.

The arrangement of the present invention thus makes it possible to produce copies having a head portion which is always the same, but wherein the subdivision of the form may vary in dependence upon the portion of the web 23 that has been selected and placed in requisite position, and wherein individual items of information vary in dependence upon which portion of the pattern sheet in the envelope 19 have been placed so as to be visible in the gap 28. If for special requirements a head portion such as that on the pattern sheet 26 is required, together with all of the information on the pattern sheet in the envelope 19, then it is simply necessary to move the pattern sheet 27.

FIG. 3 shows an arrangement for the stepwise advancement of the clamping device 21 with the envelope 19 and a pattern sheet 30 which is located therein. The arrangement in FIG. 3 will be seen to have a toothed wheel 32 which is turnable about a shaft 31 under the influence of a spring (not shown). A blocking pawl 33 and a switching pawl 34 are provided. By briefly energizing an electromagnet 35 which acts upon the pawls 33 and 34, the wheel 32 is momentarily freed for rotation in the direction of the arrow which is effected by the biasing action of the spring, so that the wheel can turn by a distance corresponding to the circumferential spacing between consecutive teeth thereon. The clamping device 21 is connected with the wheel 32 via a rope 36 and rollers 37 and 38 about which the endless rope 36 is trained, so that each momentary excitation of the electromagnet 35 causes a stepwise displacement of the upper pattern sheet 30 by a distance corresponding to the spacing between consecutive lines, the lines of course extending parallel to the gap 28 (see FIG. 2). The individual lines of the pattern sheet 30 have associated with them respective buttons of a keyboard 39, so that by depressing the appropriate button of the keyboard 39 an electric control circuit (not shown, but known from the art) controlling the electromagnet 35 is agitated by the number of times necessary to move the selected line into registry with the gap 28. The spring which relaxes as the pattern sheet 30 advances in stepwise direction, is tensioned again via the rope 36 and the rollers 37 and 38, and via a drive (not shown) which can be coupled with the roller 37. This also causes the pattern sheet 30 to be returned to its starting position. Of course, a stepwise operating motor can also be used in place of the arrangement shown in FIG. 3.

It is frequently desired that the variable data of successive copies be obtained from consecutive lines of the variable-data copy sheet 30. In other words, one copy may be desired to carry line 1 of the sheet 30, the next copy may be required to carry line 2, and so on. In this case, an automatic transport of the copy sheet 30 by one or more lines after each copy is made, may be desirable. This can be obtained in known manner with the aid of a contact-making or breaking timer which controls the electromagnet 35 and is provided with a turnable contact arm.

FIG. 3 further shows an arrangement for the continuous advancement of the web 23 on the rollers 24 and 25. The visible portion of the web 23 is provided with the desired boxes or lines of a form which is identified with reference numeral 40. The drive of the rollers 24 and 25 is illustrated in FIG. 3, utilizing a brake-type motor 41 which is connected with the rollers 24 and 25 via a toothed sprocket 42, a timing belt 43 and respective timing belts 44 and 45 and a slip coupling 46 or 47, respectively. The purpose of the slip couplings is to assure that despite the varying diameters of the quantity of web 23 on the respective rollers 24 and 25, the web 23 will always be maintained taut.

The web 23 is provided along one marginal portion with a sequence of perforations 48 into which a pinwheel 49 engages which is shown in broken lines. When the web 23 advances, it causes a turning of the pinwheel 49 which is transmitted via a shaft 50 and two gears 51 and 52 to a contact arm 53. A stationary contact plate 54 is mounted adjacent and for cooperation with the contact arm 53 and is provided with interruptions in the contact track which, when they move into the region of the contact arm 53, cause a deenergization of the motor 41 and therefore a stopping of the web 23. Each different type of form 40 on the web 23 has one of these interruptions associated with it on the contact plate 54 so that the web 23 is always displaced (during each energization of the motor 41) by a distance corresponding to the spacing between two consecutive ones of the forms 40. A keyboard 55 is provided having buttons which are each associated with one of the forms 40 and which, when they are depressed, energize the motor 41 briefly via a known control circuit (not shown, but conventional) so that the contact arm 53 is moved past the respective interruption of the contact path. Thereafter, electric energy is supplied via the contact arm 53 to the motor 41 until the next interruption is reached and interrupts the supply of electrical energy. The direction of rotation of the motor 41 can be made reversible, so that the web 23 can be moved in mutually opposite directions. Further, the control circuit activated by the keyboard 55 is advantageously so constructed that depending upon the selection made by depressing a respective button an automatic displacement of the web 23 is effected, corresponding not only to the distance between two consecutive ones of the forms 40, but corresponding to the distance between any two selected forms 40 on the web 23, i.e. not only for example between forms 1 and 2, but for example between forms 1 and 5, or the like.

In the illustrated embodiment the direction of advancement of the web 23 is normal to the direction of advancement of the clamping device 21. However, it should be understood that it is possible and in certain cases even advantageous, to so arrange the device that the web 23 travels parallel to the direction of displacement of the clamping device 21. This requires an appropriate rearrangement of the position of the forms 40 on the web 23.

Figure 4:
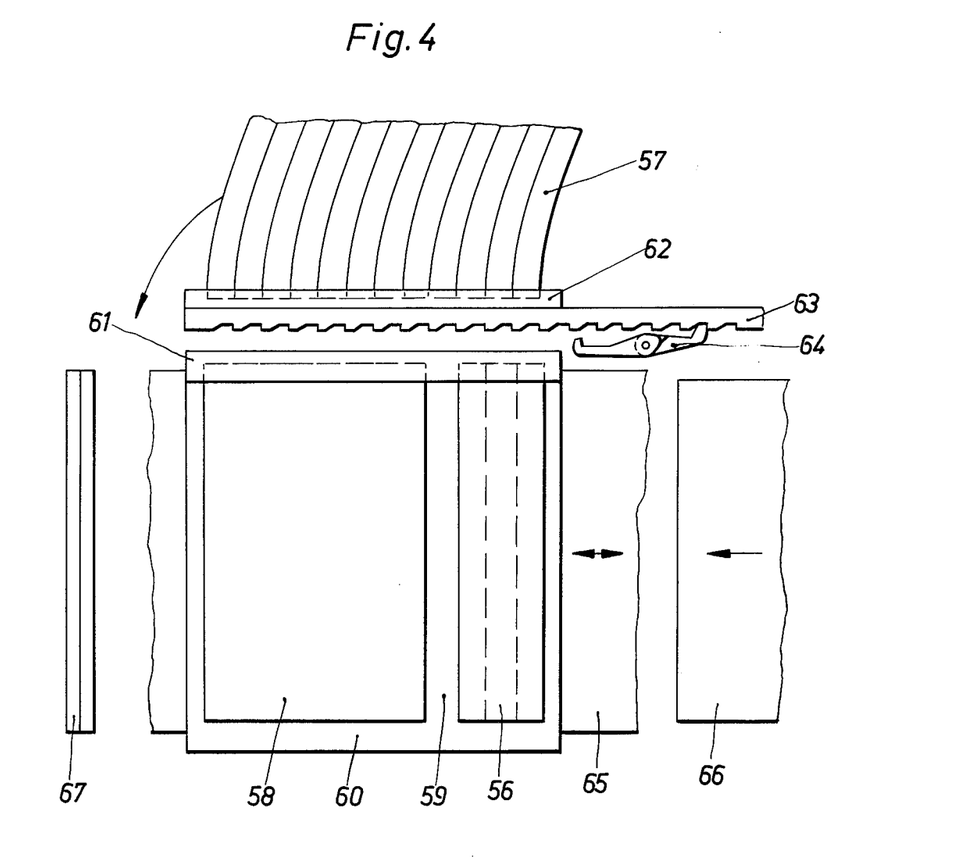
FIG. 4 is a top-plan view illustrating a detail of a further embodiment of the invention.

In some instances it is advantageous and desired that the clamping devices 21 and 22 be arranged laterally of the support 9 and extend parallel to the direction of advancement of the web 23 and to the advancement of the copy sheets 15. A device according to the invention having these features is shown in FIG. 4.

That Figure shows a pattern sheet 56 corresponding to the pattern sheet 26 of FIG. 2, a pattern sheet 57 corresponding to the pattern sheet 30 of FIG. 3 and a pattern sheet 58 corresponding to the pattern sheet 27 of FIG. 2. The pattern sheets 56 and 58 define one another a slot or gap 59 through which one or more lines of indicia of the pattern sheet 57 are visible and can be copied. The pattern sheets 56 and 58 are located in a transparent plastic envelope 60 which is held by a stationary clamping device 61. In addition, the clamping device 61 may be of two parts, of which the part holding the pattern sheet 58 may be displaceable relative to the part holding the pattern sheet 56, so that the width of the slot 59 can be selected at will. The pattern sheet 57 is held by a clamping device 62 which can be pivoted and also shifted in the longitudinal direction of the clamping device 61 and which is shown in the upwardly pivoted condition in FIG. 4.

The displacement of the clamping device 62 with the pattern sheet 57 which it holds is effected by means of an arrangement analogous to the one in FIG. 3. This arrangement has a rack 63 and a pawl 64 which engages with the rack. A force acts upon the rack 63 in the left-hand direction of FIG. 4, so that a momentary operation of the pawl 64 results in a leftward displacement of the rack 63 and thus of the pattern sheet 57, by a distance corresponding to the spacing between two consecutive teeth of the rack 63. A displacement of the rack 63 towards the right is effected by a corresponding counterforce, and is not prevented by the presence of the pawl 64. The latter is advantageously controlled by manually activatable buttons each of which is associated with one line of indicia on the pattern sheet 57. In this manner it is possible to place any desired portion of the pattern sheet 57 into registry with the gap 59 so that the indicia on the pattern sheet 57 can be copied together with a selected portion of the indicia on the pattern sheet 57 and any indicia there may be present on the pattern sheet 58.

A transparent web 65, which may be of synthetic plastic material as the web 23 in FIG. 1, is arranged beneath the envelope 60 which accommodates the pattern sheet 56 and 58. It is displaceable in direction parallel to the elongation of the clamping devices 61 and 62 in mutually opposite directions. The web 65 is wound onto rollers (not shown) and carries a plurality of different imprints for various forms or the like, of which any one can be placed into registry with the transparent support surface on which the pattern sheets are located. The displacement of the web 65 into a desired position can be effected by a transporting device which can also be activated by means of manually operable buttons. Beneath the web 65 there is located a copy web 66, for example a zinc-oxide paper on which the selected form on the web 65 is reproduced, together with those portions of the pattern sheets 56, 57 and/or 58 which are visible from below the support. The direction of advancement of the travelling copy web 66 also is parallel to the direction of advancement of the web 65 and the clamping devices 61 and 62. After the copy has been made on the copy web 66, the latter is severed into individual sheets by a cutting device 67 which acts transversely to the elongation of the copy web 66.

The reproduction of the originals can also be onto a web carrying a light-sensitive layer, instead of directly onto the copying web 66. In this case, the light sensitive layer will be charged and processed in the same manner as discussed earlier with respect to the layer 1 on the drum 2 in FIG. 1, and subsequently the picture formed of powder on the light-sensitive layer will be transferred to a copy sheet or web corresponding to the web 66.

Figure 5:
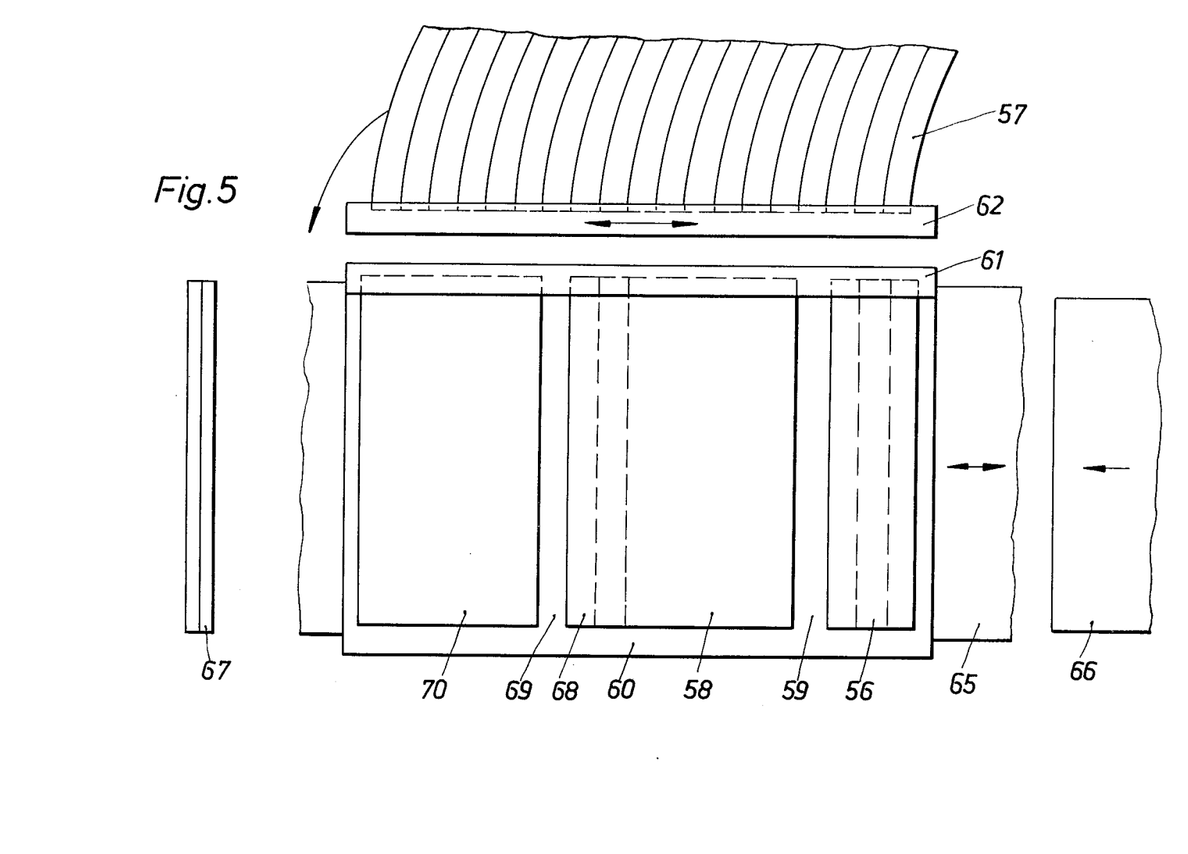
FIG. 5 is a view similar to FIG. 4, but illustrating a detail of another embodiment of the invention.

FIG. 5 is reminiscent of FIG. 4 but shows an arrangement in which there is provided, adjacent to the pattern sheet 58, a further pattern sheet 68 which again may carry non-varying information to be reproduced, for example a letterhead or the like. Adjacent to the sheet 68 there is provided a further pattern sheet 70 which forms with the sheet 68 a second gap 69. This arrangement makes it possible to simultaneously produce two copies, each having a form 40 (FIG. 3), a head portion and a portion containing variable information selected from the pattern sheet 57, i.e. the respective portions of the pattern sheet 57 which are visible in the gaps 59 and 69, respectively.

Figures 6, 7:
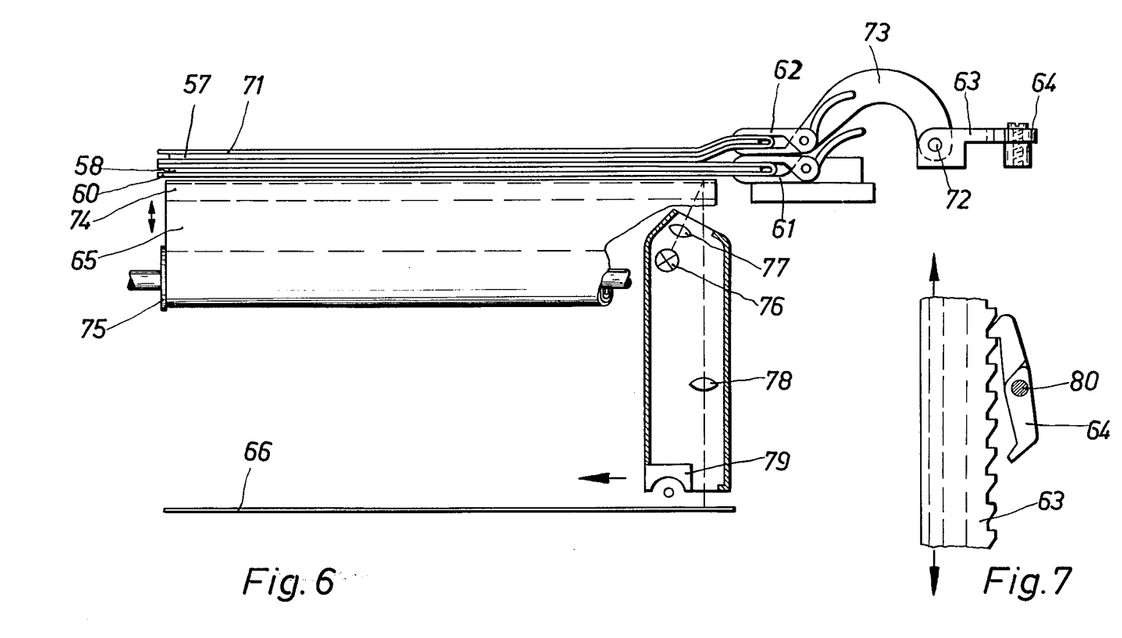
FIG. 6 is a diagrammatic view, partly in section, illustrating details of a further copier which are necessary for an understanding of the embodiment in FIG. 6.
FIG. 7 is a view showing a fragmentary detail of FIG. 6.

FIG. 6 shows an embodiment having a lower transparent plastic envelope 60 and above this an upper transparent plastic envelope 71 in which the pattern sheet 57 is located. These envelopes are held by the clamping devices 61 and 62, respectively. The clamping device 62 is mounted on a bracket 73 that can be pivoted about an axis 72 so that it can be pivoted upwardly out of the position shown in FIG. 6 in order to permit ready access to the lower envelope 60 and the clamping device 61. The bracket 73 is mounted on the rack 63 for movement with the same.

The envelopes 60 and 71 are located on the transparent support member 74, for example a planar glass plate or the like, although it could of course also be curved as in FIG. 1. The web 65, which is convoluted about respective rollers located at opposite lateral edges of the support surface 74 and of which the roller 75 is shown in FIG. 6, also travels either above or below the support surface 74. It can be made to travel below the support 74 if the depth resolution of the copying lens system 77, 78 is adequate to compensate for the distance between the web 65 and the pattern sheets.

The arrangement further has a light source 76 and the lens systems 77 and 78 located intermediate the member 74 and the copy web 66 and which arrangement is movable in direction normal to the elongation of the clamping devices 61 and 62. A charging arrangement 79 is provided which electrically charges the copying paper 66 (or a web carrying a light-sensitive layer in lieu of the copy web 66) shortly before exposure. If the copy web 66 is directly subjected to exposure, then the reproduction of the material from the pattern sheets must be correct (as opposed to mirror-reverse), whereas the reproduction would be mirror-reversed on the light-sensitive layer of a web provided with such a layer, because the mirror image on the light-sensitive layer would then subsequently be reproduced on the copy sheet in correct manner.

FIG. 7 shows a detail of FIG. 6, illustrating the rack 63 and the pawl 64 which is pivotable about an axis 80. FIG. 7 is self-explanatory.

Figure 8:
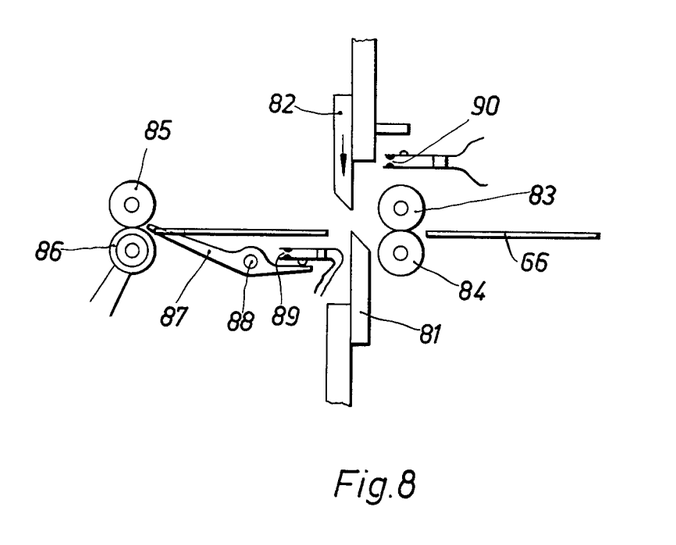
FIG. 8 is a diagrammatic side view showing a detail of a cutting device that can be used in the embodiment of FIG. 6.

FIG. 8, finally, illustrates a cutting device for severing successive portions of the copy web 66 into individual sheets. This cutting device has a fixed blade 71 located below the path of travel of the copy web 66, and an upper blade 82 located above the path of travel and being movable vertically relative thereto. The copy web 66 is advanced in the illustrated position of the blades 81 and 82 by two transport rollers 83 and 84 until the leading end of the web 66 is detected by a feeler 87 just ahead of two normally stationary transport rollers 85 and 86. On engagement with the leading edge of the copy web 66 the feeler 87 is pivoted about an axis 88, thereby closing a switch 89 which triggers a downward movement of the upper blade 82. This in turn causes a severing of the leading portion of the copy web 66 and also closes a switch 90 which initiates rotation of the rollers 85, 86 by activating the not illustrated drive of the roller 86, so that the severed portion, which is now a separate sheet, is transported forwardly by the rollers 85 and 86. The blade 82 returns to the upper position shown in FIG. 8.

It will be understood that each of the elements described above, or two or more together, may also find a useful application in other types of constructions differing from the types described above.

While the invention has been illustrated and described as embodied in an electrostatic copier, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an electrostatic copier, a combination comprising a transparent support member having a support surface and an opposite surface; light source means for directing light against said opposite surface; pattern sheet holding means for holding on said support surface first pattern sheet means which defines an elongated gap and for also holding second pattern sheet means overlying said first pattern sheet means and provided with lines of indicia parallel to said gap; transporting means for transporting said second pattern sheet means stepwise relative to said first pattern sheet means in direction normal to said gap so as to expose succeeding ones of said lines in said gap; and third pattern sheet means intermediate said first pattern sheet means and said light source means and being provided with pattern portions, including moving means for moving different ones of said pattern portions into predetermined positions relative to said first and second pattern sheet means.

2. A combination as defined in claim 1, wherein said third pattern sheet means comprises a transparent web provided with said pattern portions.

3. A combination as defined in claim 1, wherein said moving means comprises moving members arranged for moving said third pattern sheet means in a direction normal to the direction of movement of said second pattern sheet means.

4. A combination as defined in claim 1, wherein said moving means comprises moving members arranged for moving said third pattern sheet means in a direction parallel to the direction of movement of said second pattern sheet means.

5. A combination as defined in claim 1, wherein said third pattern sheet means comprises a transparent web provided with said pattern portions, and said moving means comprises take-up and pay-out rollers about which said web is convoluted and which are rotatable about respective parallel axes.

6. A combination as defined in claim 5, said moving means further comprising a drive for rotating said rollers about said axes.

7. A combination as defined in claim 5, said drive including a brakeable motor; and further comprising control means for said motor, including a contact-making and breaking timer connected in circuit with said motor, a continuous sequence of perforations formed in said web lengthwise thereof, and a pinwheel engaging into said perforations and being connected with said timer for driving the same.

8. A combination as defined in claim 1, said support member having an edge portion extending parallel to said direction of transport of said second pattern sheet means; and wherein said pattern sheet holding means includes a stationary first holding device for said first pattern sheet means, and a second holding device for said second pattern sheet means movable by said transporting means, both of said holding devices extending laterally of and parallel to said edge portion and to the direction of movement of said third pattern sheet means.

9. A combination as defined in claim 8, wherein said pattern sheet holding means for said first pattern sheets including a holding device for first pattern sheets which define said gap and an additional gap extending parallel to the same.

10. A combination as defined in claim 8, wherein said support member is a planar glass plate.

11. A combination as defined in claim 8, wherein said third pattern sheet means comprises a transparent web provided with said masking portions and being located intermediate said light-source means and said opposite surface.

12. A combination as defined in claim 8; further comprising means for advancing a copy web, onto which copies are being made from said pattern sheet means, in a predetermined path; and cutting means for cutting said copy web, including two blades extending transversely of said path above and below the same, respectively.

13. A combination as defined in claim 12; further comprising detecting means located downstream of said cutting means in the direction of advancement of said cutting web for detecting a leading edge of the cutting web and thereupon triggering operation of said cutting means, so that the copy web is automatically subdivided into sheets of predetermined size.

14. A combination as defined in claim 13, wherein said advancing means comprises sheet transporting rollers downstream of said cutting means and including a drive connected with said detecting means and activated thereby in response to operation of said cutting means by said detecting means.

15. A combination as defined in claim 8; further comprising a lens arrangement movable parallel to said transparent support member for converting mirror images of the indicia on said pattern sheet means into correct images to be reproduced on a copy web.

16. A combination as defined in claim 8; further comprising a lens arrangement movable parallel to said transparent support member for converting correct images of the indicia on said pattern sheet means into mirror images to be reproduced on a copy drum.

17. A combination as defined in claim 1, wherein said pattern sheet holding means comprises transparent envelopes of synthetic plastic material.

18. A combination as defined in claim 1, wherein said third pattern sheet means comprises a transparent web provided with said pattern portions and being located intermediate said first pattern sheet means and said support surface.

19. A combination as defined in claim 1, wherein said transporting means comprises a toothed wheel, a plurality of pawls alternately cooperating with said wheel, and means for effecting engagement and disengagement of said pawls with said wheel.

20. In an electrostatic copier, a combination comprising a transparent support member having a support surface and an opposite surface; light source means for directing light against said opposite surface; pattern sheet holding means for holding on said support surface first pattern sheet means which defines an elongated gap and for also holding second pattern sheet means overlying said first pattern sheet means and provided with lines of indicia parallel to said gap; transporting means for transporting said second pattern sheet means stepwise relative to said first pattern sheet means in direction normal to said gap so as to expose succeeding ones of said lines in said gap; and masking means intermediate said first pattern sheet means and said light source means and being provided with masking portions, including a transparent web provided with said masking portions, moving means for moving different ones of said masking portions into predetermined positions relative to said pattern sheet means, including take-up and pay-out rollers about which said web is convoluted and which are rotatable about respective parallel axes, and a drive for rotating said rollers about said axes, and control means for said drive, including a stationary first contact adjacent the path of movement of said web and a second contact movable synchronously with said web and relative to said first contact.

21. In an electrostatic copier, a combination comprising a transparent support member having a support surface and an opposite surface and an edge portion extending in a direction; light source means for directing light against said opposite surface; pattern sheet holding means for holding on said support surface first pattern sheet means which defines an elongated gap normal to said direction and for also holding second pattern sheet means overlying said first pattern sheet means and provided with lines of indicia parallel to said gap, including a stationary first holding device for said first pattern sheet means, and a movable second holding device for said second pattern sheet means, both of said holding devices extending laterally of and parallel to said edge portions, and transparent envelopes of synthetic plastic material for said pattern sheet means; transporting means for transporting said second pattern sheet means stepwise relative to aaid first pattern sheet means in said direction so as to expose succeeding ones of said lines in said gap; and masking means intermediate said first pattern sheet means and said light source means and being provided with masking portions, including moving means for moving different ones of said masking portions parallel to said direction into predetermined positions relative to said pattern sheet means.

22. In an electrostatic copier, a combination comprising a transparent support member having a support surface and an opposite surface and an edge portion extending in a direction; light source means for directing light against said opposite surface; pattern sheet holding means for holding on said support surface first pattern sheet means which defines an elongated gap normal to said direction and for also holding second pattern sheet means overlying said first pattern sheet means and provided with lines of indicia parallel to said gap, including a stationary first holding device for said first pattern sheet means, and a movable second holding device for said second pattern sheet means, both of said holding devices extending laterally of and parallel to said edge portion; transporting means for transporting said second pattern sheet means stepwise relative to said first pattern sheet means in said direction so as to expose succeeding ones of said lines in said gap; and masking means intermediate said first pattern sheet means and said light source means, including a transparent web provided with masking portions and being located intermediate said first pattern sheet means and said support surface and moving means for moving different ones of said masking portions parallel to said direction into predetermined positions relative to said pattern sheet means.

23. In an electrostatic copier, a combination comprising a transparent support member having a support surface and an opposite surface and an edge portion extending in a direction; light source means for directing light against said opposite surface; pattern sheet holding means for holding on said support surface first pattern sheet means which defines an elongated gap normal to said direction and for also holding second pattern sheet means overlying said first pattern sheet means and provided with lines of indicia parallel to said gap, including a stationary first holding device for said first pattern sheet means, and a movable second holding device for said second pattern sheet means, both of said holding devices extending laterally of and parallel to said edge portion; transporting means for transporting said second pattern sheet means stepwise relative to said first pattern sheet means in said direction so as to expose succeeding ones of said lines in said gap, including a rack, a plurality of pawls alternately cooperating with said rack, and means for effecting engagement and disengagement of said pawls with said rack; and masking means intermediate said first pattern sheet means and said light source means and being provided with masking portions, including moving means for moving different ones of said masking portions parallel to said direction into predetermined positions relative to said pattern sheet means.

24. In an electrostatic copier, an arrangement for forming a composite image to be copied by the copier, comprising first holding means for interchangeably holding first pattern web means having a major surface with first indicia thereon; second holding means for holding second pattern web means, having at least one transparent portion, in parallelism with said major surface of said first pattern web means; third pattern web means, having at least one additional transparent portion, and movable in a path parallel to said major surface of said first pattern web means, one of said second and third pattern web means being interposed between the other of said third and second pattern web means and said major surface of said first pattern web means, and at least said one pattern web means having second indicia thereon which are to be selectively correlated with said first indicia; transporting means for transporting one of said holding means relative to the other holding means parallel to said major surface of said first pattern web means for bringing said transparent portion of said second pattern web means into registry with selected first indicia on said major surface; and moving means for moving said third pattern web means in said path into registry of said additional transparent portion with other selected first indicia on said major surface, whereby only such first indicia will be copied by the copier which are in registry with the region of overlap of said transparent portions of said second and third web means, and only such second indicia on said one pattern web means will be copied by the copier in correlation with such first indicia, which are in registry with the respective transparent portion of said other pattern web means.

* * * * *